(12) United States Patent
Cappaert et al.

(10) Patent No.: US 9,919,814 B2
(45) Date of Patent: Mar. 20, 2018

(54) SYSTEM AND METHOD FOR POWER DISTRIBUTION IN A AUTONOMOUS MODULAR SYSTEM

(71) Applicant: SPIRE GLOBAL, INC., San Francisco, CA (US)

(72) Inventors: Jeroen Cappaert, Sint-Gillis-Waas (BE); Bryan Wong, Seaside, CA (US)

(73) Assignee: SPIRE GLOBAL, INC., San Francisco, CA (US)

( * ) Notice: Subject to any disclaimer, the term of this patent is extended or adjusted under 35 U.S.C. 154(b) by 248 days.

(21) Appl. No.: 14/632,656

(22) Filed: Feb. 26, 2015

(65) Prior Publication Data
US 2016/0251092 A1    Sep. 1, 2016

(51) Int. Cl.
| B64G 1/42 | (2006.01) |
| H02J 7/35 | (2006.01) |
| G05F 1/66 | (2006.01) |
| B64G 1/44 | (2006.01) |
| G05B 15/02 | (2006.01) |
| B60R 16/033 | (2006.01) |
| B64G 1/10 | (2006.01) |

(52) U.S. Cl.
CPC .............. *B64G 1/428* (2013.01); *B64G 1/10* (2013.01); *B64G 1/425* (2013.01); *B64G 1/443* (2013.01); *G05B 15/02* (2013.01); *G05F 1/66* (2013.01); *H02J 7/35* (2013.01)

(58) Field of Classification Search
CPC .......... B60R 16/033; H02J 7/35; G05B 15/02; G05F 1/66
USPC ........................................................... 307/9
See application file for complete search history.

(56) References Cited

U.S. PATENT DOCUMENTS

| 4,204,127 A | 5/1980 | Carter, II |
| 4,454,510 A | 6/1984 | Crow |
| 4,618,779 A | 10/1986 | Wiscombe |
| 4,771,185 A | 9/1988 | Feron et al. |

(Continued)

FOREIGN PATENT DOCUMENTS

| CN | 104300663 A | 1/2015 |
| EP | 1037405 A2 | 9/2000 |
| WO | 2014121197 A2 | 8/2014 |

OTHER PUBLICATIONS

Canopus Systems, CubeSat Deployable Low Frequency Monopole Antenna, NASA Ames Research Park, Bldg. 19 Room 2077 Moffet Field, CA 94035, www.canopus-us.com, V1.0, Aug. 16, 2010.

(Continued)

*Primary Examiner* — Jared Fureman
*Assistant Examiner* — Win Htun
(74) *Attorney, Agent, or Firm* — Troutman Sanders LLP (57) ABSTRACT

A power distribution system and a method thereof regulate power distribution in a small form factor satellite flight system. The power distribution system may include a power source and a plurality of power channels. The power channels may distribute power from the power source to a plurality of systems in the small form factor satellite flight system. A processor may monitor power availability of the power source. The processor may also collect housekeeping information of the plurality of systems in the small form factor satellite flight system. The processor may regulate the power channels based on the power availability and the housekeeping information.

26 Claims, 10 Drawing Sheets

(56) References Cited

U.S. PATENT DOCUMENTS

| | | | |
|---|---|---|---|
| 5,019,956 A | 5/1991 | Nakayama et al. | |
| 5,142,217 A | 8/1992 | Gontowski, Jr. | |
| 5,324,989 A | 6/1994 | Thornton | |
| 5,410,728 A | 4/1995 | Bertiger et al. | |
| 5,592,394 A | 1/1997 | Wiscombe | |
| 5,604,430 A * | 2/1997 | Decker | G05F 1/67 136/293 |
| 5,604,920 A | 2/1997 | Bertiger et al. | |
| 5,708,589 A | 1/1998 | Beauvais | |
| 5,752,047 A | 5/1998 | Darty et al. | |
| 5,770,895 A | 6/1998 | Kumasaka | |
| 5,940,739 A | 8/1999 | Conrad et al. | |
| 5,963,166 A | 10/1999 | Kamel | |
| 6,023,291 A | 2/2000 | Kamel et al. | |
| 6,067,453 A | 5/2000 | Adiwoso et al. | |
| 6,096,502 A | 8/2000 | Lee | |
| 6,240,124 B1 | 5/2001 | Wiedeman et al. | |
| 6,271,877 B1 | 8/2001 | LeCompte | |
| 6,356,966 B1 | 3/2002 | Loach et al. | |
| 6,381,228 B1 | 4/2002 | Prieto, Jr. et al. | |
| 6,535,798 B1 | 3/2003 | Bhatia et al. | |
| 6,584,452 B1 | 6/2003 | Prieto, Jr. et al. | |
| 6,718,213 B1 | 4/2004 | Enberg | |
| 6,819,011 B2 | 11/2004 | Kernahan et al. | |
| 6,856,045 B1 | 2/2005 | Beneditz et al. | |
| 7,007,179 B2 | 2/2006 | Mares et al. | |
| 7,020,790 B2 | 3/2006 | Mares | |
| 7,162,653 B2 | 1/2007 | Mares et al. | |
| 7,209,838 B1 * | 4/2007 | Wright | G01R 19/2513 700/291 |
| 7,228,206 B2 | 6/2007 | Kahle et al. | |
| 7,262,943 B2 | 8/2007 | Stellato et al. | |
| 7,503,511 B2 | 3/2009 | Mueller | |
| 7,781,908 B2 | 8/2010 | DuBose et al. | |
| 8,068,937 B2 | 11/2011 | Eaves | |
| 8,204,632 B2 | 6/2012 | Abi-Samra | |
| 8,306,385 B2 | 11/2012 | Hino et al. | |
| 8,335,574 B2 | 12/2012 | Middlemiss | |
| 8,378,913 B2 | 2/2013 | Tao et al. | |
| 8,411,969 B1 | 4/2013 | Joslin et al. | |
| 8,482,610 B2 | 7/2013 | do Carmo Miranda | |
| 8,487,996 B2 | 7/2013 | Mann et al. | |
| 8,494,684 B2 | 7/2013 | Yamamori et al. | |
| 8,527,106 B2 | 9/2013 | Muneshima et al. | |
| 8,531,524 B2 | 9/2013 | do Carmo Miranda | |
| 8,754,547 B2 | 6/2014 | Jin et al. | |
| 8,781,639 B2 | 7/2014 | Li et al. | |
| 2002/0108065 A1 | 8/2002 | Mares | |
| 2003/0095367 A1 | 5/2003 | Mares et al. | |
| 2003/0217362 A1 | 11/2003 | Summers et al. | |
| 2004/0008034 A1 | 1/2004 | Mastoris et al. | |
| 2004/0117077 A1 | 6/2004 | Kahle et al. | |
| 2004/0207266 A1 * | 10/2004 | Abel | H02J 9/066 307/80 |
| 2004/0226046 A1 | 11/2004 | Weng et al. | |
| 2004/0263386 A1 | 12/2004 | King et al. | |
| 2005/0057870 A1 | 3/2005 | Stellato et al. | |
| 2006/0101296 A1 | 5/2006 | Mares et al. | |
| 2006/0282724 A1 | 12/2006 | Roulo | |
| 2007/0182628 A1 | 8/2007 | Pomerantz et al. | |
| 2008/0071633 A1 | 3/2008 | Ozkan et al. | |
| 2008/0086509 A1 | 4/2008 | Wallace | |
| 2009/0007240 A1 | 1/2009 | Vantalon et al. | |
| 2009/0087029 A1 | 4/2009 | Coleman et al. | |
| 2009/0290534 A1 | 11/2009 | Connors et al. | |
| 2011/0116441 A1 | 5/2011 | Wyler | |
| 2011/0170797 A1 | 7/2011 | Johnson | |
| 2012/0018585 A1 | 1/2012 | Liu et al. | |
| 2012/0197447 A1 | 8/2012 | Fossion et al. | |
| 2012/0274303 A1 | 11/2012 | Yamamori et al. | |
| 2013/0018529 A1 | 1/2013 | Ploschnitznig | |
| 2013/0051661 A1 | 2/2013 | Robinson et al. | |
| 2013/0184890 A1 | 7/2013 | Li et al. | |
| 2013/0235234 A1 | 9/2013 | Cucci et al. | |
| 2013/0271628 A1 | 10/2013 | Ku et al. | |
| 2013/0298083 A1 | 11/2013 | Bertoldo et al. | |
| 2013/0299642 A1 | 11/2013 | Eickhoff | |
| 2014/0015970 A1 | 1/2014 | do Carmo Miranda | |
| 2014/0027576 A1 | 1/2014 | Boshuizen et al. | |
| 2014/0039729 A1 | 2/2014 | Puig-Suari et al. | |
| 2014/0039963 A1 | 2/2014 | Augenstein et al. | |
| 2014/0040282 A1 | 2/2014 | Mann et al. | |
| 2014/0059166 A1 | 2/2014 | Mann et al. | |
| 2014/0118256 A1 | 5/2014 | Sonoda et al. | |
| 2014/0222472 A1 | 8/2014 | Platzer | |
| 2015/0039879 A1 * | 2/2015 | Puig-Suari | B64G 1/66 713/2 |
| 2015/0146019 A1 | 5/2015 | Aoyama | |
| 2015/0199556 A1 | 7/2015 | Qian et al. | |

OTHER PUBLICATIONS

Carson-Jackson ("Satellite AIS—Developing Technology or Existing Capability?", The Journal of Navigation ;2012), 65, 303-321).

European Search Report dated Jul. 22, 2016 issued in corresponding European Patent Application No. 14745871.5.

International Search Report and Written Opinion dated Apr. 27, 2016 issued in corresponding PCT International Application No. PCT/US2015/054906.

International Search Report dated Feb. 24, 2016, issued in corresponding Application No. PCT/US2015/054889.

International Search Report dated Nov. 29, 2016, issued in corresponding PCT Application No. PCT/US2016/014876.

Bao Han, "Design a Nano-Satellite for Observation of Transient Lunar Phenomena (TLP)", Lulea University of Technology—Master's Thesis, Sep. 24, 2009.

Institute of Electronic Systems, University of Aalborg "Power Supply for the AAU Cubesat" , P5-Project Group 01GR509, Dec. 20, 2001.

van der Berg "Fault-Tolerant On-Board Computer Software for the Delfi-n3Xt Nanosatellite" MSc Thesis, Delft University of Technology, Faculty of Electrical Engineering, Mathematics and Computer Science, 2012.

* cited by examiner

SYSTEM AND METHOD FOR POWER DISTRIBUTION IN A AUTONOMOUS MODULAR SYSTEM

CROSS REFERENCE TO RELATED PATENT APPLICATIONS

This disclosure incorporates by reference the following pending U.S. patent applications: (1) Ser. No. 14/515,142, title: Satellite Operating System, Architecture, Testing and Radio Communication System filed on Oct. 15, 2014; (2) Ser. No. 14/514,836, title: Back-Plane Connector for Cubesat filed on Oct. 15, 2014; and (3) Ser. No. 14/514,573, title: Novel Satellite Communication System filed on Oct. 15, 2014. The contents of these three applications are incorporated by reference herein as if each was restated in full.

FIELD OF THE INVENTION

The inventions herein are directed to novel systems and methods for regulating power distribution in a flight system. In particular, the present invention is directed to systems and methods implemented to route and regulate power in small factor satellites (known in the art as "cubesats").

BACKGROUND

A growing interest in low earth orbit satellites having a small form factor has led to an increase in both launches of the vehicles and the recognition that earlier techniques for control thereof are inadequate. Due to their smaller size, cubesats generally cost less to build and deploy into orbit above the Earth. As a result, cubesats present opportunities for educational institutions, governments, and commercial entities to launch and deploy cubesats for a variety of purposes with fewer costs compared to traditional, large satellites.

Although small, a cubesat needs to power many systems thereon in order to perform various tasks. As such, there is a need for an intelligent, fast, cost-efficient, and simple mechanism to handle power management of the various systems running on the cubesat. Various embodiments of the disclosed technology address these needs.

SUMMARY

The disclosed technology relates to a power distribution system implemented in a small form factor satellite flight system. The power distribution system may include a power source and a plurality of power channels. The power channels may distribute power from the power source to a plurality of systems in the small form factor satellite flight system. The plurality of systems may be external to the power distribution system. A processor may regulate a power distribution by the power source to the flight system. For example, the processor may monitor power availability of the power source. The processor may also collect housekeeping information from the plurality of systems in the flight system. The processor may regulate the power channels based on the power availability and the housekeeping information. In some embodiments, the flight system may be an orbital satellite communication system or a cubesat. In some embodiments, the power distribution system may include a user interface to receive a user-initiated command.

Another aspect of the disclosed technology relates to a method for regulating power distribution in a small form factor satellite flight system. A processor may monitor power availability of a power source. The processor may collect housekeeping information from a plurality of systems in the flight system. A plurality of power channels may distribute power from the power source to the plurality of systems. The processor may regulate the plurality of power channels based on the power availability and the housekeeping information. The processor may regulate each power channel by switching the power channel on and off. In some embodiments, the processor may reset the power channels.

In some embodiments, the power source may include an electrical power source and a battery. The electrical power source may be a power generator, such as a solar power system. In some embodiments, the flight system may be an orbital satellite communication system or a cubesat.

Various aspects of the described example embodiments may be combined with aspects of certain other example embodiments to realize yet further embodiments. It is to be understood that one or more features of any one example may be combined with one or more features of the other example. In addition, any single feature or combination of features in any example or examples may constitute patentable subject matter. Other features of the technology will be apparent from consideration of the information contained in the following detailed description.

BRIEF DESCRIPTION OF THE DRAWINGS

The following Detailed Description of the technology is better understood when read in conjunction with the appended drawings. For the purposes of illustration, there is shown in the drawings exemplary embodiments, but the subject matter is not limited to the specific elements and instrumentalities disclosed. Components in the figures are shown for illustration purposes only, and may not be drawn to scale.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

1. Satellite Overview

Figure 1:
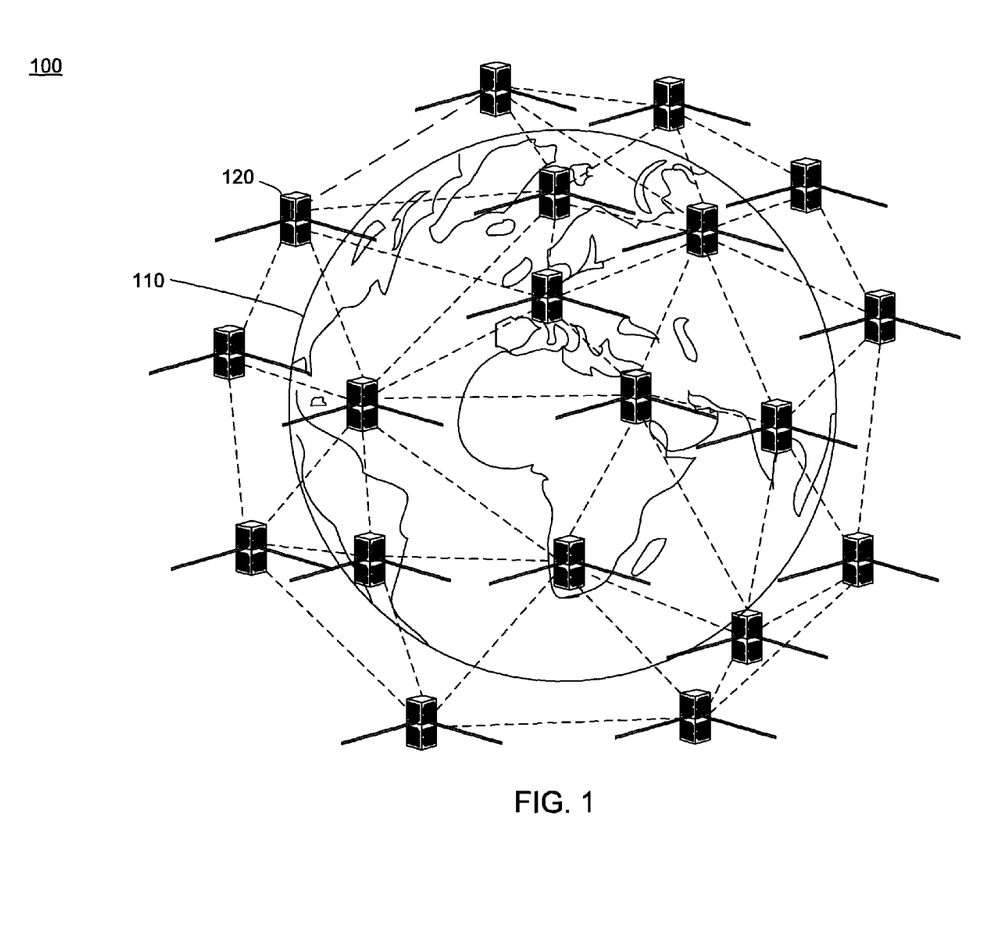
FIG. 1 illustrates an example terrestrial and orbital communication network according to one aspect of the disclosed technology.

The present application relates to, but not limited to, a terrestrial and orbital communication network having a constellation of satellites. FIG. 1 illustrates an exemplary terrestrial and orbital communication network 100 covering at least a portion of a planet 110, such as the Earth. The network 100 may include a constellation of satellites 120 each configured to collect data from a point on the planet from time to time or on a regular basis. The satellite 120 may analyze the collected data to monitor maritime activities, including but not limited to tracking ships or oceangoing vessels, detecting illegal, unreported and unregulated fishing or pirate activities, monitoring trade transit, and detecting oil spills, among other possibilities.

The satellite 120 may be a cubesat having a small form factor. For instance, the size of the satellite 120 may be relatively small, in general not exceeding 10 cm×10 cm×30 cm and 10 kg of mass. In one embodiment, the satellite 120 may be based on an industry standard, developed in 2001 by Stanford University and California Polytechnic Institute and described in the document "CubeSat Design Specification." Cubesats may be launched and deployed using a common deployment system. For example, cubesats may be launched and deployed from a mechanism called a Poly-PicoSatellite Orbital Deployer (P-POD). P-PODs may be mounted to a launch vehicle and carry cubesats into orbit. P-PODs may deploy cubesats once a proper signal is received from the launch vehicle.

Figure 2:
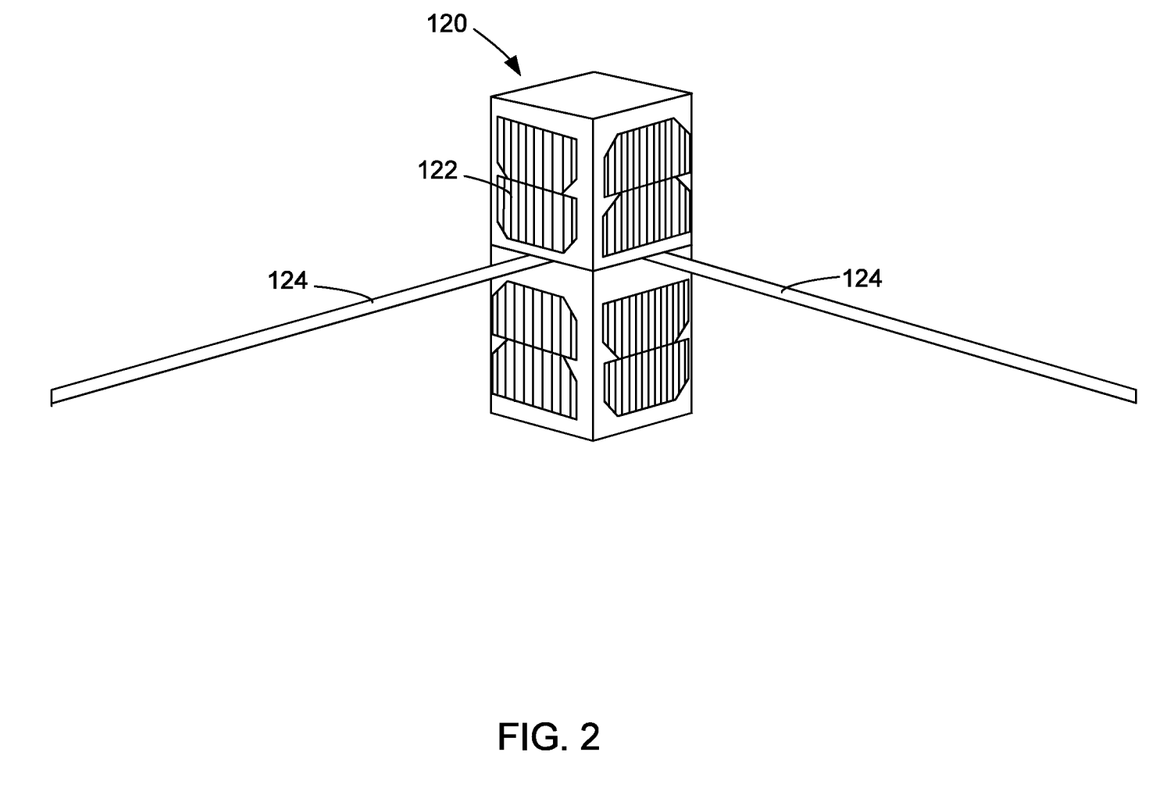
FIG. 2 is a schematic drawing of a satellite according to one aspect of the disclosed technology.

FIG. 2 is a schematic drawing of a satellite according to one aspect of the disclosed technology. As shown in FIG. 2, the satellite 120 may include one or more solar panels 122. The solar panels 122 may be configured to provide energy to one or more components contained within the satellite 120. The satellite 120 may also include one or more antennas 124 that may extend when fully deployed.

Figure 3:
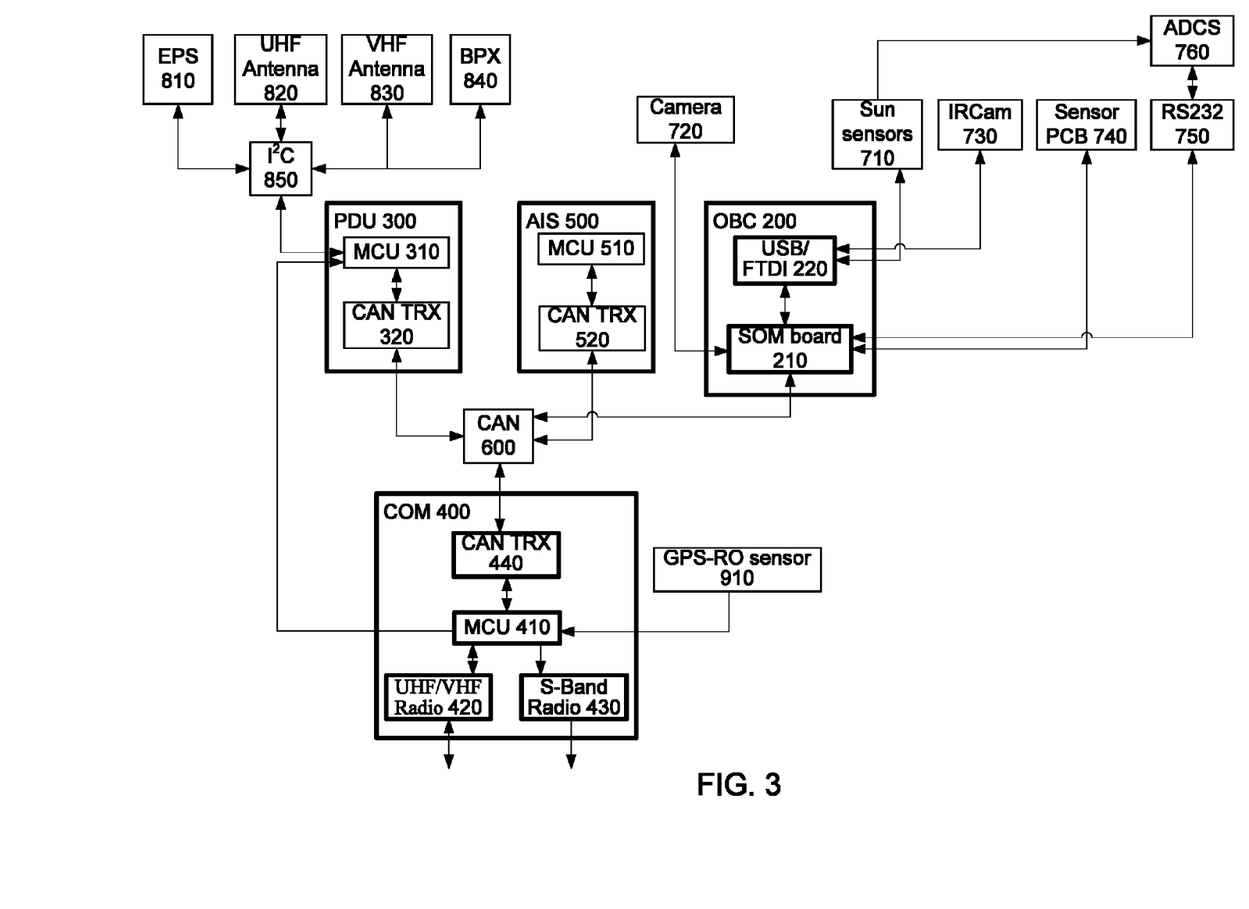
FIG. 3 is a block diagram of satellite architecture according to one aspect of the disclosed technology.

FIG. 3 illustrates an architecture design of the satellite 120 according to one aspect of the disclosed technology. As shown in FIG. 3, the satellite 120 may include an on board computer (OBC) 200 that acts as a central computer, a power distribution unit (PDU) 300 that routes and regulates power throughout the satellite 120, and a communications system 400 configured to handle radio communications for the satellite 120. The satellite 120 may also include an automatic identification system (AIS) 500. The OBC 200, the PDU 300, the communications system 400, and the AIS 500 may communicate with one another via a controller area network (CAN) bus 600. AIS is a ship beacon identification system installed on all ocean going vessels larger than 300 gross tons or passenger vessels, as directed by the International Maritime Organization.

As shown in FIG. 3, the OBC 200 may include a System on Module (SOM) board processor 210, such as any standard off-the-shelf processor or any application customized processor. The OBC 200 may also include a USB/FTDI connector 220. The PDU 300 may include a microcontroller (MCU) 310 and a CAN transceiver 320. The communications system 400 may include a MCU 410, radios such as a UHF/VHF radio 420 and an S-band radio 430, and a CAN transceiver 440. The AIS 500 may include a MCU 510 and a CAN transceiver 520.

In addition, the satellite 120 may also include one or more other systems, subsystems, components, devices, parts or peripherals. For example, the satellite 120 may include one or more sun sensors 710, one or more cameras 720 and an infrared camera 730, a sensor printed circuit board (PCB) 740, RS232 750, and an attitude detection/control system (ADCS) 760 directly or indirectly coupled to the OBC 200. The satellite 120 may include an electrical power source (EPS) 810, a UHF antenna system 820, a VHF antenna system 830, and one or more batteries (BPX) 840, all of which may be coupled to the PDU 300 via an inter-integrated circuit ($I^2C$) 850. Each antenna system may have one or more microcontrollers configured to perform a deployment of the antennas. Each antenna may have four antenna elements that may be deployed individually.

The satellite 120 may also include a GPS radio occultation receiver, such as a GPS radio occultation sensor (GPS-RO) receiver 910, coupled to the communications system 400.

Detailed discussions of the PDU 300 are provided herein.

2. Power Distribution Unit

The PDU 300 may be a logic control system designed to route power in an intelligent way throughout the satellite 120 as needed.

Figure 4:
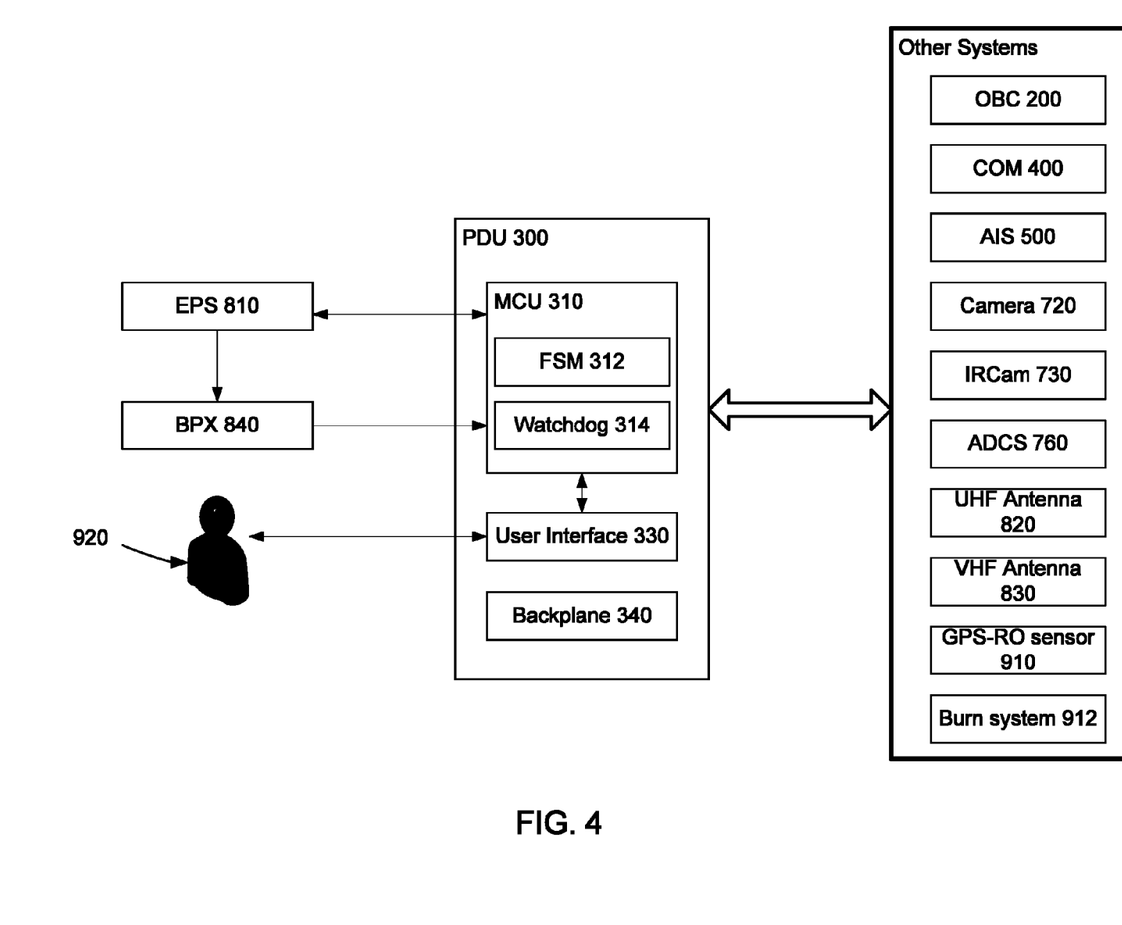
FIG. 4 is a block diagram of the power distribution unit according to one aspect of the disclosed technology.

FIG. 4 is a block diagram of the PDU 300 according to one aspect of the disclosed technology. As shown in FIG. 4, the PDU 300 may include power sources 810 and 840 that provide power to one or more systems, subsystems, components, devices, parts or peripherals in, which may be collectively referred to as systems. The PDU 300 may include a control unit 310 on board implemented with logic that governs power access by these systems, and a user interface 330 that enables a user 920 to issue one or more commands to the PDU 300.

With continued reference to FIG. 4, the power distribution unit 300 may include a backplane 340 that may serve as a backbone for connecting one or more printed circuit boards or systems to the power distribution unit 300. Further discussion regarding the backplane 340 may be found in U.S. patent application Ser. No. 14/514,836, entitled "Back-Plane Connector for Cubesat" filed on Oct. 15, 2014, the entirety of which is incorporated herein by reference. The backplane 340 may include one or more electrical connectors and parallel signal traces that connect one or more printed circuit boards or systems to the power distribution unit 300. Each pin of each connector may be linked to the same relative pin of all the other connectors to form a common computer bus.

Systems powered by the PDU 300 may include but not limited to one or more of the following: the OBC 200, the communications system 400, the AIS 500, the camera 720, the infrared camera (IRC) 730, the UHF antenna system 820, the VHF antenna system 830, and the ADCS 760, the GPS-RO sensor 910 and a burn system 912. The burn system 912 may be implemented based on a simple AVR-based solution. The PDU 300 may have two dedicated burn channels in its backplane 340. The PDU 300 may be configured to switch on and off raw battery voltage supplied to the burn channels. The burn system may be a burn wire system. The burn system may include burn resistors or NiChrome wire. The burn system may be configured to burn the release mechanism of the solar panels 122.

Further details with respect to the power sources, the control unit 310, the user interface 330 and the connectors are provided herein.

2.1 Power Sources

As shown in FIG. 4, the PDU 300 may include two power sources including the EPS 810 and one or more batteries 840. The EPS 810 may be a power generator such as a solar power system with one or more solar panels 122. In one embodiment, when the power is low, the PDU 300 may configure orientation of the solar panels 122 to collect more power.

Figure 5:
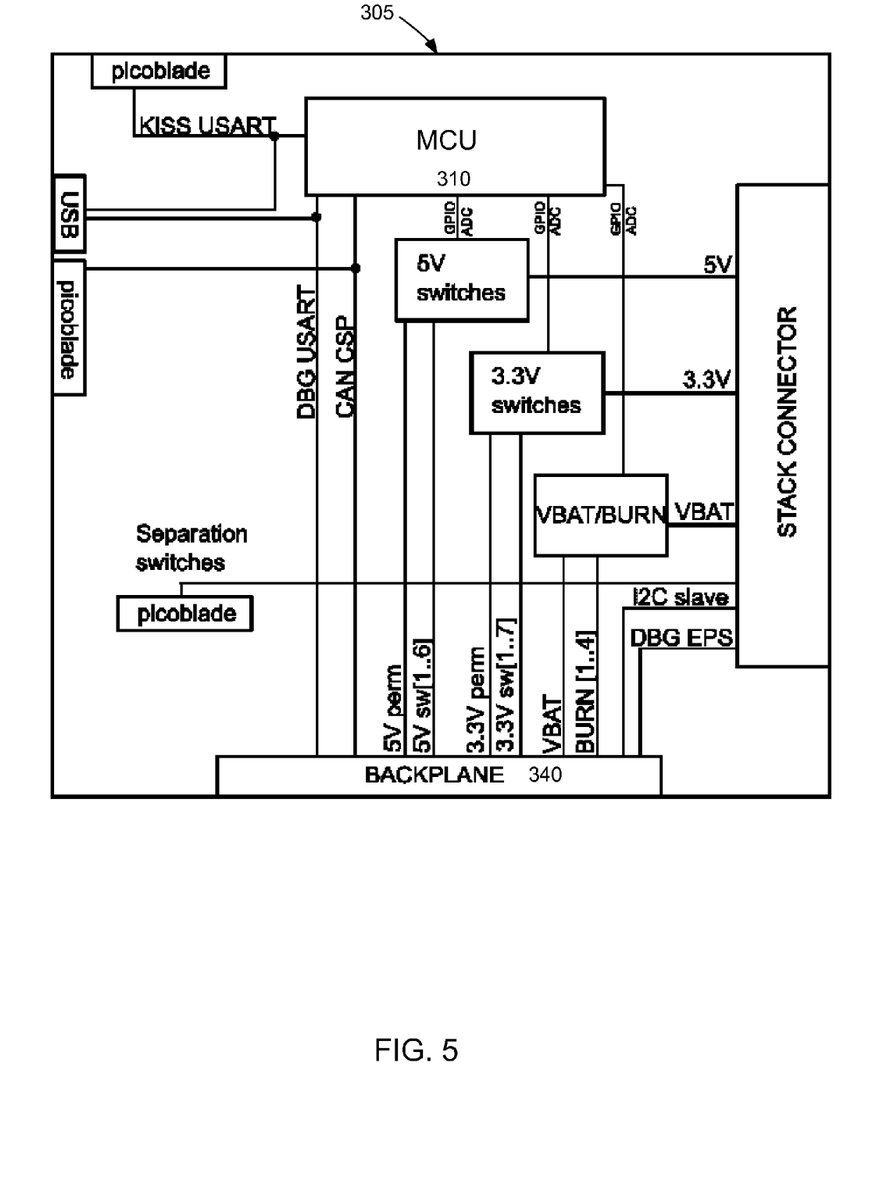
FIG. 5 is another block diagram of the power distribution unit according to one aspect of the disclosed technology.

In some embodiments, the PDU 300 may include one or more power channels that take power from the EPS 810. The PDU 300 may have an indicator that indicates each power channel. As illustrated in FIG. 5, the PDU 300 may have various switches to switch on and off the power channels as needed. For instance, the PDU 300 may regulate one or more power channels by switching them on and off over a CAN interface or a general purpose input/output (GPIO) interface. The PDU 300 may translate the stack connector of the EPS 810 (e.g., PC104 stack connector) to a backplane connector.

Returning back to FIG. 4, one or more batteries (BPX) 840 may draw power from the EPS 810. The battery 840 may be charged by the EPS 810 while the EPS 810 generates power. The battery 840 may power one or more systems connected to the PDU 300. In some instances, the battery 840 may power all systems in the satellite 120. Power distribution to one or more such systems in the satellite 120 may be turned on or off as needed, as controlled by the control unit 310.

2.2 Control Unit

The control unit 310 may be any standard off-the-shelf processor or any application customized processor, such as an Atmel SAM4L ARM cortex-M4 MCU. The control unit 310 may maintain and report internal housekeeping data of the PDU 300. Further, the control unit 310 may monitor systems connected to the PDU 300 by collecting housekeeping data from the systems. Housekeeping data may include, but not limited to, battery voltage measurement, temperature measurement, watchdog states, and other system information. The control unit 310 may rely on the housekeeping data to assess an overall health and state of the systems. Based on the collected information, the control unit 310 may determine whether to switch on or off one or more power channels, or the entire satellite 120. In some embodiments, the control unit 310 may hard reset one or more power channels or the whole satellite 120.

Returning back to FIG. 4, the PDU 300 may implement a finite state machine 312 that monitors states of one or more batteries 840. Each battery 840 may have four states "Full," "Normal," "Safe," and "Critical," indicative of its availability of power or voltage measurement. Based on the availability of power, the PDU 300 may regulate distribution of power to one or more systems by switching on and off certain channels as needed.

Table 1 below illustrates a default voltage setting for each state. When a battery 840 reaches about or below the "Critical" state, the PDU 300 may shut off all its power channels. The voltage settings for the states may be configured or overridden.

TABLE 1

Default voltage settings of battery states

| Voltage | State | Default voltage (V) |
|---|---|---|
| High | Full | V1 |
| | Normal | V2 |
| | Safe | V3 |
| Low | Critical | V4 |

With continued reference to FIG. 4, the PDU 300 may implement one or more watchdogs 314 to monitor states of one or more systems connected thereto, or monitor the satellite 120 as a whole.

Figure 6:
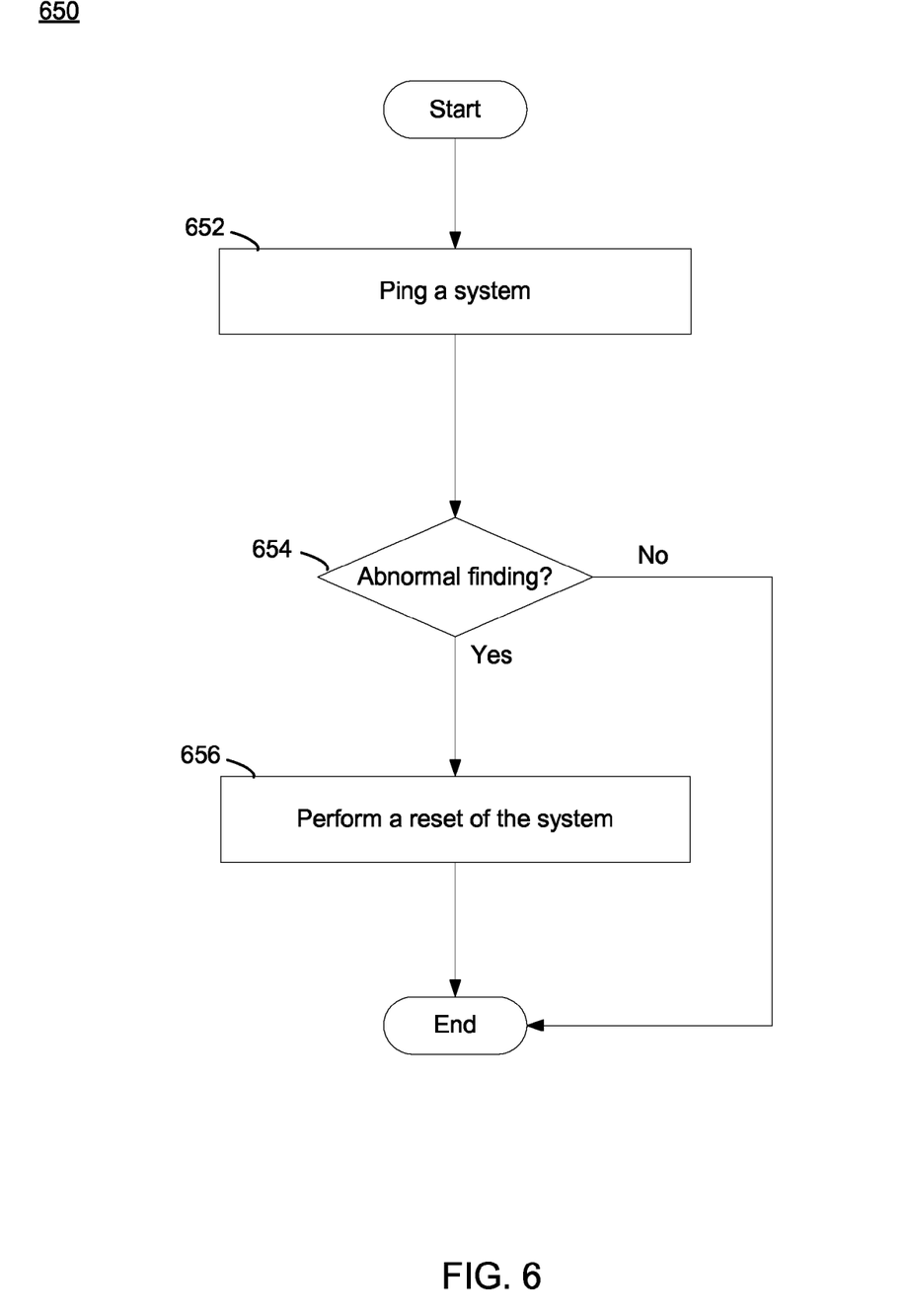
FIG. 6 is a flow chart illustrating example steps performed by a watchdog.

FIG. 6 is a flow chart 650 illustrating example steps performed by a watchdog 314. Steps described herein may be performed by a processor located in the PDU 300. At 652, the watchdog 314 may verify if a system is functional by pinging the system at configurable times. At 654, the watchdog 314 may determine if there is any abnormal finding. If the watchdog 314 detects any abnormal findings, the control unit 310 of the PDU 300 may, at step 656, automatically perform a reset. For example, if a system does not respond to a ping, the control unit 310 may perform a hard reset of the system. If the watchdog 314 does not detect any abnormal findings, then no additional step may be taken.

There may be two types of watchdogs: a cubesat space protocol (CSP) watchdog and a ground watchdog. The CSP watchdog may ping one or more CSP systems, or in some instances, all CSP subsystems, that are on the CAN bus 600. The watchdog may ping the systems for a predetermined number of times with a predetermined ping delay between every two pings. The number of pings and the ping delay between every two pings may be configured as needed. By default, the number of pings may be preset, and the ping delay may also be preset to. The watchdog may include a counter to keep track of the number of pings sent to a system. If no response is received from a system after the predetermined number of times, e.g., 3 times, the watchdog may reset one or more power channels associated with that system, and may also reset the counter. If a response is received from the system, the watchdog may also reset the counter to 0. The watchdog may include a reset counter for each system. Upon reset of a system, the reset counter associated with that system may increase. Both counters may be part of the housekeeping data monitored by the control unit 310.

The ground watchdog may be a dedicated watchdog configured to check if a designated flag has been reset. If that flag has not been reset, the ground watchdog may perform a reset of all the power channels, a hard reset of the whole satellite 120, and a reset of the PDU 300 in case the EPS 810 does not respond to an I²C command. The designated flag may be set within a predetermined time frame. The predetermined time frame may have a default value of 84600 s or 24 h. In some instances, once a timeout is reached, the designated flag may be set only by way of a specific command.

In addition, the PDU 300 may obtain other information of one or more systems connected thereto, including but not limited to voltage channel, state information such as on or off, current measurements, and temperature measurements. By way of example, the PDU 300 may perform power channel current measurement. The PDU 300 may also perform power channel latchup detection. Further, the PDU 300 may track temperature measurements of one or more systems, keep history record thereof, and monitor operations of the systems. In some embodiments, the temperature measurements may not be relied upon for regulating the power channels.

2.3 User Interface

With continued reference to FIG. 4, the user interface 330 may enable a user 920 to issue one or more commands to the PDU 300. The user 920 may enter commands through a terminal, such as a "gosh" terminal. For example, the user 920 may instruct the PDU 300 to perform a remote hard reset for a system regulated by the PDU 300 and restore the system to a known state. Table 2 below illustrates some example commands of the PDU 300. Actual command nomenclature may be dictated in part by the operating system or programming language and processor selection.

TABLE 2

Basic commands of the power distribution unit

| Command No. | Description |
| --- | --- |
| 1 | Set command timeout |
| 2 | Set PDU node |
| 3 | Toggle power to a particular subsystem |
| 4 | Housekeeping command (telemetry, status) |
| 5 | PDU configuration commands |
| 6 | Reset ground watchdog timer |
| 7 | EPS commands |
| 8 | AntS commands |
| 9 | BPX commands |

Command No. 1 may set the local command timeout for the PDU commands. A default timeout may be 1000 ms.

Command No. 2 may set the node that the CSP commands can be transmitted to. The default node may be CSP node 2.

Command No. 3 may switch power channels on the PDU 300 on and off. For example, one or more power channels may be switched on or off to control one or more specific systems, such as an IR camera system. The actual power channels may be abstracted away so systems in their entirety can be turned on or off Command No. 4 may return the housekeeping data maintained by the PDU 300. Such housekeeping data may include battery voltage measurements, channel states, watchdog states, board temperatures, and the like.

Command No. 5 may give access to configurable features of the PDU 300. Table 3 below illustrates a few example commands that may be used in conjunction with this command.

TABLE 3

Commands to access configuration of the power distribution unit

| Command No. | Description |
| --- | --- |
| 10 | Set FSM voltages |
| 11 | Set the watchdog |
| 12 | Set VBAT burn channel configuration |
| 13 | Set the current measurement system channel bias values |
| 14 | Set subsystem FSM configuration |
| 15 | recall present configuration for pdu system |
| 16 | store current configuration to flash |
| 17 | Restore default configuration in serial flash |

Command No. 10 may configure the voltage on the finite state machine to override the default setting.

Command No. 11 may configure the watchdogs on the PDU 300. For example, a command can set the CSP watchdog to ping the CSP systems 5 times with a 60 second delay before resetting the systems. Command No. 11 may configure the ground watchdog to time out after 24 h.

Command No. 13 may be called by a satellite engineer during calibration of the PDU 300.

Command No. 15 may get and print the configuration.

Command No. 16 may save the current configuration to a flash memory in the PDU 300. Such saved configuration may be persisted through resets.

Command No. 17 may restore the internal hardcoded configuration of the PDU 300. A reset may be needed to apply the restored configuration.

Command No. 6 may reset the ground watchdog timer. If this is not done manually, the PDU 300 may instruct an EPS hard reset after timeout. The timeout may be configured through a command and may have a default value of 84600 s or 24 h.

Command No. 7 may provide access to the EPS 810. Table 4 below illustrates information that may be obtained by this command.

TABLE 4

EPS information accessible by command

| Command No. | Description |
| --- | --- |
| 18 | Retrieve EPS version |
| 19 | Hard reset a certain channel |
| 20 | Softreset the EPS MCU |
| 21 | EPS housekeeping |

Command No. 18 may return a fixed value. This command may be used for verifying the connection to the EPS.

Command No. 19 may perform a hard reset of the EPS power channels. Various power channels including 3.3V channel, 5V channel, VBAT channel, or ALL channels may be reset as such.

Command No. 20 may reset the EPS MCU. This command may not reset any of the power channels.

Command No. 21 may return the EPS internal housekeeping data. Such data may include raw EPS ADC values, which may be parsed using an EPS datasheet with conversion tables. In some examples, the housekeeping data may include but not limited to array voltages, array temperatures, array currents, channel currents, and EPS status.

Command No. 8 may provide access to the antennas, for example the UHF and VHF antennas. Table 5 below illustrates descriptions of others commands that may be used in conjunction with Command No. 8 to obtain information of the antennas.

TABLE 5

Commands to obtain information of the antennas

| Command No. | Description |
| --- | --- |
| 22 | Get antenna system housekeeping |
| 23 | Get and print last stored housekeeping info |
| 24 | Arm system |
| 25 | Cancel deployment |
| 26 | Disarm system |
| 27 | Antenna deploy single [0-3] [time sec] |
| 28 | Antenna deploy auto [time sec] |
| 29 | Antenna reset |
| 30 | Get/Set configuration |
| 31 | Start VHF deploy sequence |

Command No. 22 may request health data about a given antenna deployer, where choices may include UHFA, UHFB, VHFA, and VHFB.

Command No. 23 may request last stored health data information about a given antenna deployer.

Command Nos. 24 and 26 may control arming and disarming of an antenna deployer. Command No. 24 may allow relevant commands to deploy antennas. Command No. 26 may make it not possible to deploy antennas.

Command No. 25 may stop an antenna deployment in process for a given antenna deployer.

Command No. 27 may deploy an antenna. Parameters that may be used with the this command include <UHFA|UHFB|VHFA|VHFB> <antenna number: 0-3> <burn time (s)><override=1|0>. The "override" parameter may force a burn even if the antenna deployer detects that the antenna has been deployed.

Command No. 28 may command antenna deployer to iteratively deploy all four antennas for the number of seconds provided in the command line.

Command No. 29 may reset an antenna deployer.

Command No. 30 may be used to get or set the current configuration for an antenna deployer. The current setting may include one or more of the following information: burn on boot, burn time(s), retries, retry delay(s), and init delay(s).

Command No. 31 may deploy the VHF antennas.

Command No. 9 may provide access to the battery pack. Following commands may be used in conjunction with Command No. 9. For example, a housekeeping command may return the housekeeping information of the matter. A reset command may reset the MCU for the matter. Another command may reset the internal bootcounter for the battery.

2.4 Connectors

As shown in FIG. 3, the PDU 300 may be connected to its power sources and various systems in the satellite 120 via one or more of the following connections: the I$^2$C 850, universal asynchronous receiver/transmitter (UART), and the CAN bus 600. By way of example, the PDU 300 may interface with the EPS 810 over the I$^2$C 850. In another example, the PDU 300 may interface with the battery 840 over the I$^2$C 850, where the I$^2$C 850 may deliver battery state-of-health information such as input/output current, voltages, temperatures, and the like to the PDU 300. Further, the PDU 300 may interface with one or more antenna systems, such as ISIS AntS antenna systems, over I$^2$C. For example, the PDU 300 may connect to the UHF antenna system 820 and the VHF antenna system 830 via the I$^2$C 850. Still further, the PDU 300 may carry an interface for the burn system 912.

The I$^2$C 850 may be implemented on a PCB. Table 6 below illustrates a sample configuration of a PCB for the I$^2$C 850.

TABLE 6

A sample configuration of an I$^2$C printed circuit board

| Part | Value | Connects from | Connects to | Default mounted | Location |
|---|---|---|---|---|---|
| R40 | 3.3 kOhm | SDA1 | 3.3 V | YES | Top, near TP7 |
| R41 | 3.3 kOhm | SCL1 | 3.3 V | YES | Top, near TP7 |
| R42 | 3.3 kOhm | SDA0 | 3.3 V | NO | Bottom, near MCU |
| R43 | 3.3 kOhm | SCL0 | 3.3 V | NO | Bottom, near MCU |
| R5 | 3.3 kOhm | Stack SDA | 3.3 V | NO | Bottom, near MCU |
| R6 | 3.3 kOhm | Stack SCL | 3.3 V | NO | Bottom, near MCU |
| R12 | 0 Ohm | SCL | Isolated MCU SCL | YES | Bottom, near MCU |
| R14 | 0 Ohm | SDA | Isolated MCU SDA | YES | Bottom, near MCU |
| R9 | 0 Ohm | Stack SDA | Backplane SDA1 | YES | Bottom, near MCU |
| R52 | 0 Ohm | Stack SCL | Backplane SCL1 | YES | Bottom, near MCU |
| R8 | 0 Ohm | Stack SCL | Backplane SCL2 | NO | Bottom, near MCU |
| R53 | 0 Ohm | Stack SDA | Backplane SDA2 | NO | Bottom, near MCU |
| R3 | 0 Ohm | SDA | Backplane SDA2 | NO | Bottom, near MCU |
| R4 | 0 Ohm | SCL | Backplane SCL2 | NO | Bottom, near MCU |
| R1 | 0 Ohm | SDA | Backplane SDA1 | YES | Bottom, near MCU |
| R2 | 0 Ohm | SCL | Backplane SCL1 | YES | Bottom, near MCU |

Table 7 below illustrates a sample configuration of a UART PCB.

TABLE 7

A sample configuration of a UART printed circuit board

| Part | Value | Connects from | Connects to | Default mounted | Location |
|---|---|---|---|---|---|
| R10 | 0 Ohm | Backplane UART5 | MCU DBG UART | YES | Top, near backplane connector and CAN breakout |
| R11 | 0 Ohm | Backplane UART5 | MCU DBG UART | YES | Top, near backplane connector and CAN breakout |
| R50 | 0 Ohm | FTDI channel 1 | MCU DBG UART | YES | Bottom, near FTDI chip |
| R51 | 0 Ohm | FTDI channel 1 | MCU DBG UART | YES | Bottom, near FTDI chip |
| R19 | 0 Ohm | FTDI channel 2 | MCU UART1 | NO | Bottom, near FTDI chip |
| R23 | 0 Ohm | FTDI channel 2 | MCU UART1 | NO | Bottom, near FTDI chip |

The CAN bus 600 may be implemented on a PCB. Table 8 below illustrates a sample configuration of a PCB for the CAN bus 600.

TABLE 8

A sample configuration of a CAN printed circuit board

| Part | Value | Connects from | Connects to | Default mounted | Location |
|------|-------|---------------|-------------|-----------------|----------|
| R36 | 120 Ohm | CANH | CANL | NO | Bottom, near CAN transceiver |
| R48 | 0 Ohm | CANL | CANL stack | NO | Bottom, near CAN transceiver |
| R49 | 0 Ohm | CANH | CANH stack | NO | Bottom, near CAN transceiver |
| R66 | 0 Ohm | CANL | CANL CAN debug pins | YES | Bottom, near CAN transceiver |
| R67 | 0 Ohm | CANH | CANH CAN debug pins | YES | Bottom, near CAN transceiver |

Figure 7:
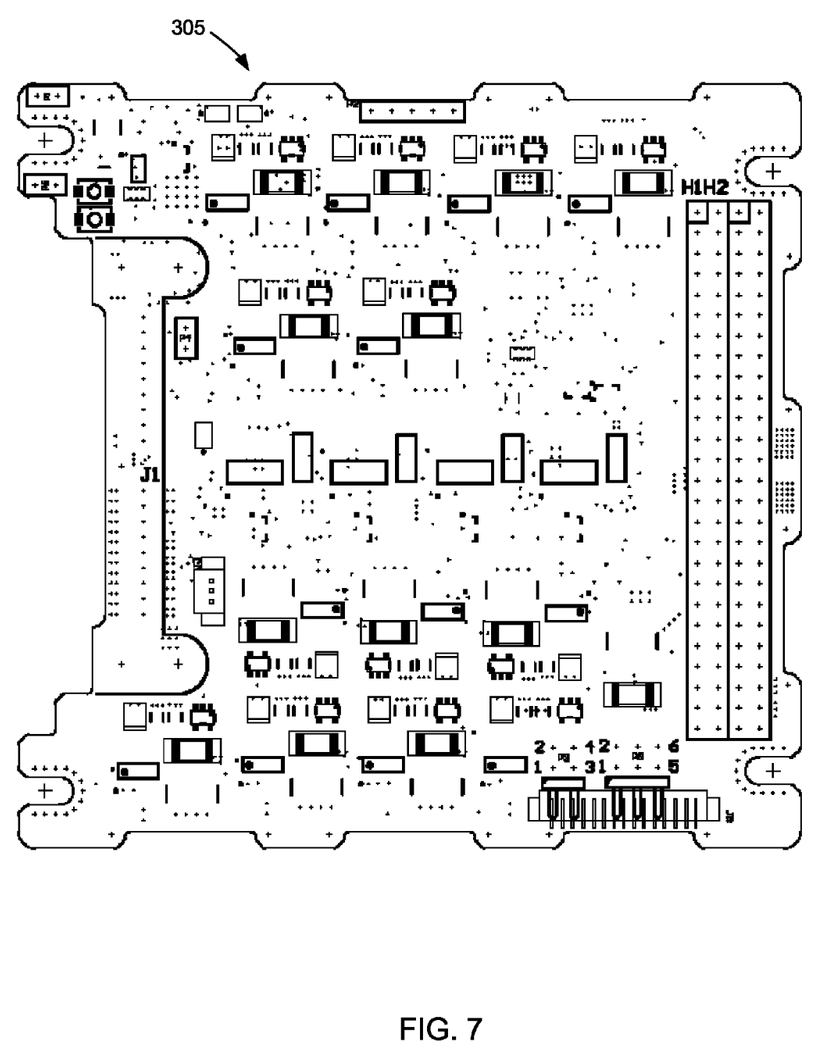
FIG. 7 is a schematic illustration of connector layout in the power distribution unit according to one aspect of the disclosed technology.
Figure 8:
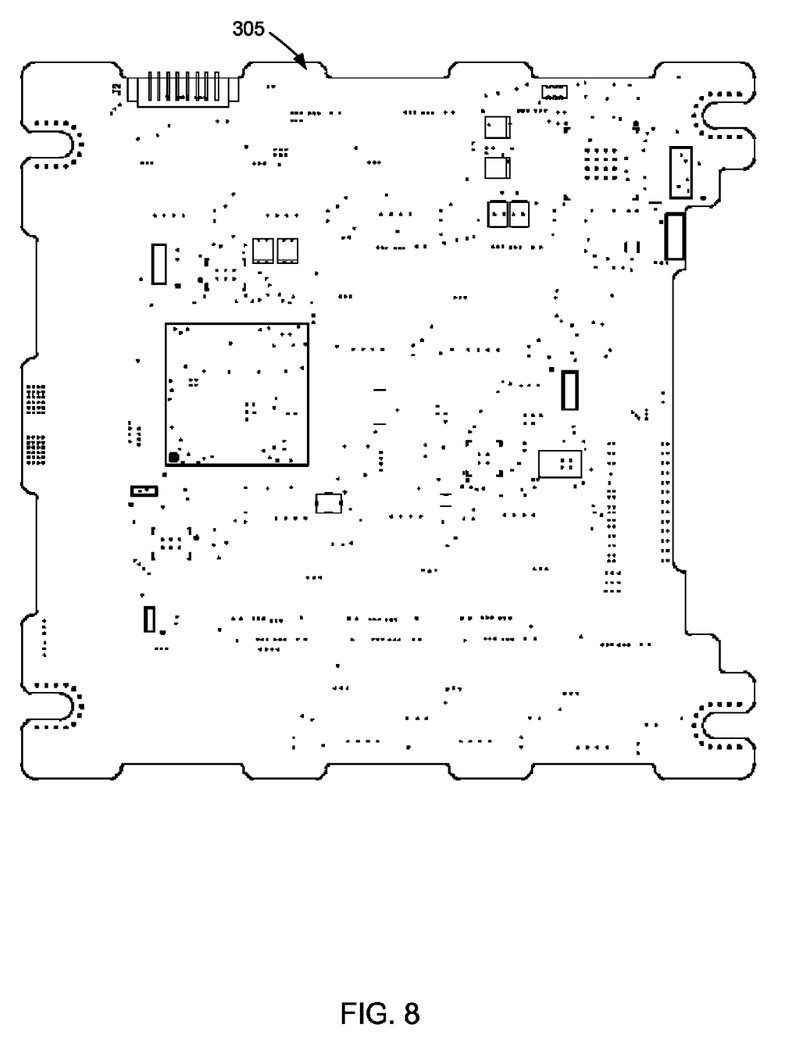
FIG. 8 is another schematic illustration of connector layout in the power distribution unit according to one aspect of the disclosed technology.

FIGS. 7-8 are schematic illustrations of connector layout in a PDU board 305 according to one aspect of the disclosed technology. According to one embodiment, the PDU board 305 may have a top side with one or more of the following connectors: test points, USB micro connector, backplane connector, stack connector, extra UART/GPIO breakout, separation switch interface, LED jumper (jump to enable LEDs), USB power jumper (jump to enable board power from USB power), CAN breakout, power breakout, separation switch 1 breakout, and separation switch 2 breakout.

The test points may provide one or more of the following functions: serial data line (e.g., I2C2SDA, I2C1SDA, SDA1 and SDA0), serial clock line (e.g., I2C2SCL, I2C1SCL, SCL1 and SCL0), VBAT_ADC, MUX_ADC, IOEXP INT, and 3V AREF.

The USB micro connector may be configured to connect to a FTDI chip that breaks out the MCU's two available UART ports.

The UART/GPIO breakout may have one or more pins associated with one or more of the following functions: receive data (e.g., RXD1), transmit data (e.g., TXD1), and ground (e.g., GND).

The separation switch interface may have one or more pins associated with one or more of the following functions: EPS BRC out, EPS PCM in, EPS DUMMY load, EPS BRC out, and VBAT+.

The LED jumper may jump to enable LEDs. The LED jumper may have one or more pins associated with one or more of the following function: ground (e.g., GND and LED_GND).

The USB power jumper may jump to enable board power from USB power. The USB power jumper may have one or more pins associated with one or more of the following functions: 5V USB and 5V in.

The CAN breakout may include one or more pins associated with one or more of the following functions: high voltage signal (e.g., CANH) and low voltage signal (e.g., CANL).

The power breakout may include one or more pins associated with one or more of the following functions: VBAT, 3.3V, 5V, EPS charge, and GND.

The separation switch 1 breakout may include one or more pins associated with one or more of the following functions: EPS BRC out and EPS PCM in.

The separation switch 2 breakout may include one or more pins associated with one or more of the following functions: EPS dummy load, EPS BRC out and VBAT+.

According to one embodiment, the PDU 300 may have a bottom side with a MCU JTAG. The MCU JTAG may include one or more pins associated with one or more of the following functions: TCK, TDI, TDO, TMS, RST, 3.3V, GND, and GND.

2.5 Satellite Bootstrapping & RBF

Figure 9:
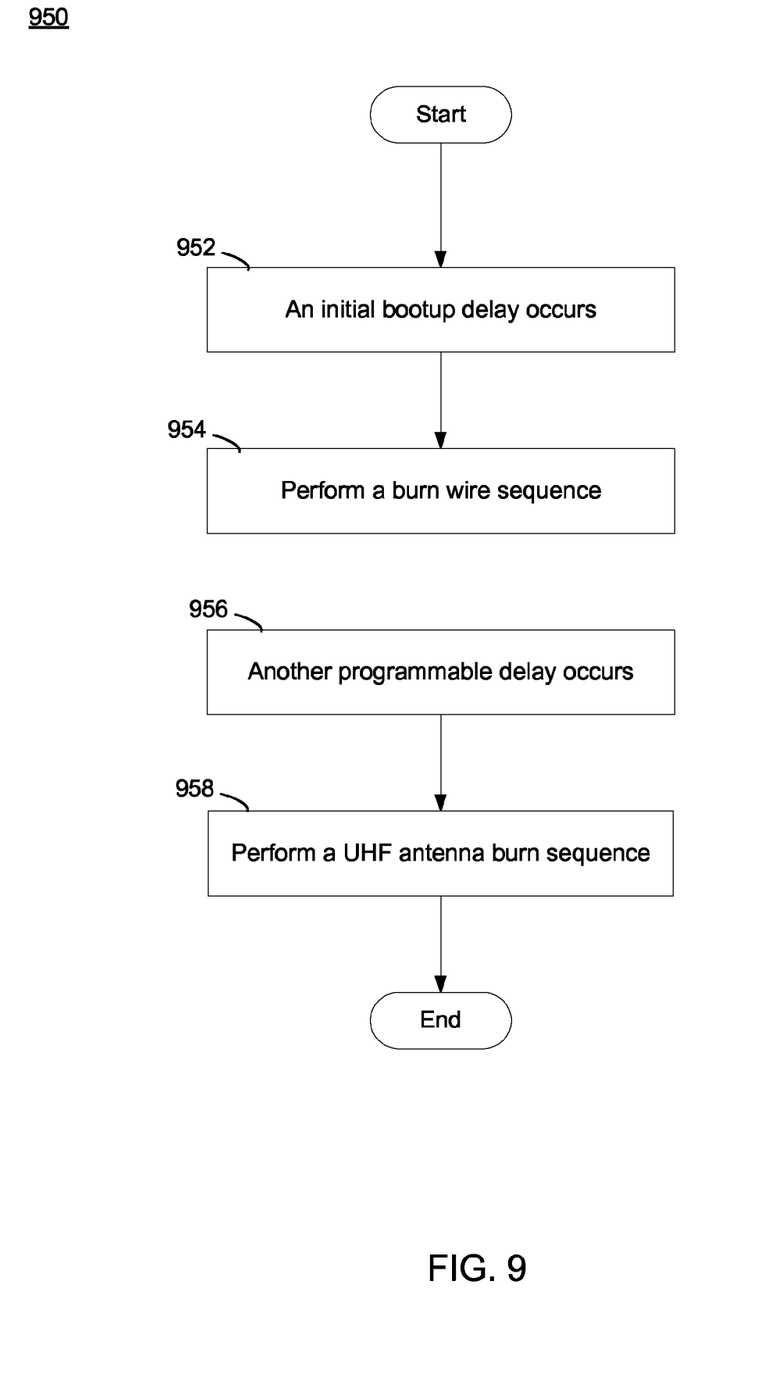
FIG. 9 is a flow chart illustrating an example sequence of bootstrapping events performed by the power distribution unit.

On initial bootup, the PDU 300 may perform a series of events for bootstrapping the satellite 120. FIG. 9 is a flow chart 950 illustrating an example sequence of events that may be executed when a RBF pin is removed.

At 952, an initial bootup delay may be programmed before the satellite bootup sequence is executed. The initial bootup delay may have a default setting of 30 s.

Next, at 954, the PDU 300 may perform a burn wire sequence, where the burn channels of the PDU 300 may be cycled through with a configurable burn time, burn delay and number of retries. The burn time may have a default value of 3 s. The burn delay may have a default value of 3 s, and the number of retries may have a default value of 3 times. As a result, the solar panels 122 may be deployed.

Thereafter, at 956, another delay may occur. Such a delay may be programmed, and may have a default setting of 10 s.

Subsequently, at 958, the PDU 300 may perform a UHF antenna burn sequence. For instance, the PDU 300 may turn on the UHF antenna and command it to perform an autodeploy sequence through both of the antenna's microcontrollers sequentially. The PDU 300 may retry a configurable number of times with a burn time and delay in between. By default, the PDU 300 may retry 3 times with a burn time of 3 s and delay of 10 s in between. After deployment, the PDU 300 may query the microcontrollers for their housekeeping information and store the last fetched antenna housekeeping information in flash memory for later retrieval. Thereafter, the PDU 300 may turn the UHF antenna system 820 back off.

2.6 Operations of the power distribution unit

Figure 10:
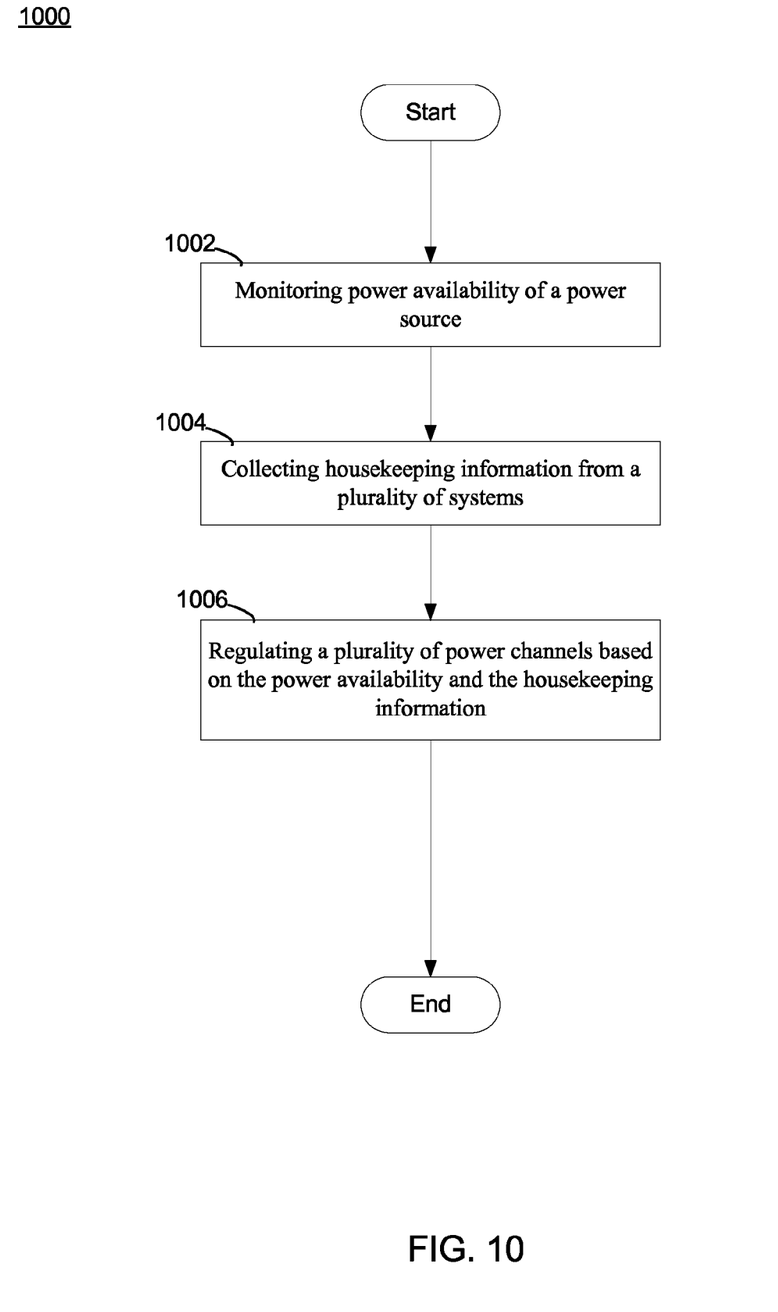
FIG. 10 is a flow chart illustrating steps performed by the power distribution unit according to one aspect of the disclosed technology.

FIG. 10 is a flow chart 1000 illustrating example steps that may be executed by the PDU 300 to regulate power distribution in the satellite 120.

At 1002, the control unit 310 of the PDU 300 may monitor power availability of a power source. At 1004, the control unit 310 may collect housekeeping information from a plurality of systems in the satellite 120. At 1006, the control unit 310 may regulate a plurality of power channels that distribute power from the power source to the plurality of systems based on the power availability and the housekeeping information.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation. For example, the disclosed technology may be implemented in an aerospace device or system, including but not limited to, satellite communication systems of all sizes, and aircrafts including airplanes, jets, and air balloon, among other possibilities. The disclosed technology may serve multiple purposes, including monitoring maritime activities, monitoring trade transit, general aviation, commercial and private purposes including transport and cargo services, and military purposes, among other possibilities.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power distribution system implemented in a small form factor satellite flight system, comprising:
 a power distribution board, coupled to a power source, the board including:
  a processor;
  a plurality of connectors connecting the board to a plurality of systems external to the power distribution board in the small form factor satellite flight system;
  a plurality of switches disposed between the processor and the connectors; and
  a user interface to receive a user-initiated command during flight of the small form factor satellite flight system, the user-initiated command instructing the processor to perform a task that modifies power distribution,
 wherein the processor regulates the power distribution from the power source to the plurality of systems in the small form factor satellite flight system by:
  monitoring a power availability of the power source;
  collecting housekeeping information from the plurality of systems in the small form factor satellite flight system;
  regulating the power distribution to the plurality of systems by controlling the switches based on the power availability and the housekeeping information;
  identifying at least one of the plurality of the systems related to the task in response to the user-initiated command; and
  controlling at least one switch related to the identified at least one system to modify the power distribution to the identified at least one system.

2. The power distribution system of claim 1, further comprising a backplane hosting at least one of the plurality of connectors.

3. The power distribution system of claim 1, wherein the processor regulates the power distribution to each of the plurality of systems by switching the switches on and off.

4. The power distribution system of claim 1, wherein the plurality of systems external to the power distribution board include at least one of an on-board computer, a communications system, an automatic identification system, a camera, an infrared camera, a UHF antenna system, a VHF antenna system, an attitude detection/control system, a GPS radio occultation receiver, and a burn system.

5. The power distribution system of claim 1, wherein the power source includes at least one of an electrical power source and a battery.

6. The power distribution system of claim 5, wherein the electrical power source is at least one of a power generator and a solar power system.

7. The power distribution system of claim 5, wherein the battery draws power from the electrical power source.

8. The power distribution system of claim 5, wherein the battery powers the plurality of systems in the small form factor satellite flight system external to the power distribution board.

9. The power distribution system of claim 1, wherein the housekeeping information includes at least one of a battery voltage measurement, a temperature measurement, a current measurement, and a system state.

10. The power distribution system of claim 1, wherein the processor is configured to reset power distribution.

11. The power distribution system of claim 1, further comprising a finite state machine that monitors the power availability of the power source.

12. The power distribution system of claim 1, further comprising a watchdog that monitors states of the plurality of the systems external to the power distribution board by pinging the systems.

13. The power distribution system of claim 1, wherein the power distribution board is connected to the plurality of systems via one or more of the following connections: an inter-integrated circuit, a universal asynchronous receiver/transmitter, and a controller area network bus.

14. The power distribution system of claim 1, wherein the processor controls antenna deployment during flight of the small form factor satellite flight system in response to the user-initiated command.

15. The power distribution system of claim 1, wherein the processor turns off an infrared camera system in response to the user-initiated command.

16. The power distribution system of claim 1, wherein the processor provides a configurable feature of the power distribution board to a user in response to the user-initiated command.

17. A method for regulating power distribution in a small form factor satellite flight system, comprising:
monitoring, by a processor of a power distribution board, a power availability of a power source;
collecting, by the processor, housekeeping information from a plurality of systems external to the power distribution board in the small form factor satellite flight system;
regulating, by the processor, the power distribution from the power source to the plurality of systems, based on the power availability and the housekeeping information, by controlling switches disposed on the power distribution board between the processor and a plurality of connectors, where the connectors connect the board to the plurality of systems;
receiving a user-initiated command from a user interface of the power distribution board during flight of the small form factor satellite flight system, the user-initiated command instructing the processor to perform a task that modifies the power distribution;
identifying, by processor, at least one of the plurality of systems related to the task in response to the user-initiated command; and
controlling at least one switch related to the identified at least one system to modify the power distribution to the identified at least one system.

18. The method of claim 17, wherein the plurality of systems include at least one of an on-board computer, a communications system, an automatic identification system, a camera, an infrared camera, a UHF antenna system, a VHF antenna system, an attitude detection/control system, a GPS radio occultation receiver, and a burn system.

19. The method of claim 17, wherein the power source includes an electrical power source and a battery.

20. The method of claim 19, wherein the battery draws power from the electrical power source.

21. The method of claim 19, wherein the battery powers the plurality of systems in the small form factor satellite flight system.

22. The method of claim 17, wherein the housekeeping information includes at least one of a battery voltage measurement, a temperature measurement, a current measurement, and a system state.

23. The method of claim 17, further comprising the step of pinging each of the plurality of the systems to obtain information thereof.

24. The method of claim 17, wherein the processor controls antenna deployment during flight of the small form factor satellite flight system in response to the user-initiated command.

25. The method of claim 17, wherein the processor turns off an infrared camera system in response to the user-initiated command.

26. The method of claim 17, wherein the processor provides a configurable feature of the power distribution board to a user in response to the user-initiated command.

* * * * *